(12) United States Patent
Wang et al.

(10) Patent No.: US 10,126,912 B2
(45) Date of Patent: Nov. 13, 2018

(54) METHOD, APPARATUS, AND DEVICES FOR DISPLAYING BROWSER NAVIGATION PAGE

(71) Applicant: GUANGZHOU UCWEB COMPUTER TECHNOLOGY CO., LTD., Guangzhou (CN)

(72) Inventors: Le Wang, Guangzhou (CN); Guang Chen, Guangzhou (CN); Haowei Wang, Guangzhou (CN); Yao Li, Guangzhou (CN)

(73) Assignee: Guangzhou UCWEB Computer Technology Co., Ltd., Guangzhou (CN)

( * ) Notice: Subject to any disclaimer, the term of this patent is extended or adjusted under 35 U.S.C. 154(b) by 478 days.

(21) Appl. No.: 14/982,325

(22) Filed: Dec. 29, 2015

(65) Prior Publication Data

US 2016/0188166 A1    Jun. 30, 2016

(30) Foreign Application Priority Data

Dec. 30, 2014 (CN) .......................... 2014 1 0851488

(51) Int. Cl.
  *G06F 3/0481* (2013.01)
  *G06F 3/0482* (2013.01)
  *G06F 17/30* (2006.01)
  *G06F 9/451* (2018.01)

(52) U.S. Cl.
  CPC ........ *G06F 3/04817* (2013.01); *G06F 3/0482* (2013.01); *G06F 9/451* (2018.02); *G06F 17/30905* (2013.01)

(58) Field of Classification Search
  CPC .................................................. G06F 3/04817
  USPC .......................................................... 715/745
  See application file for complete search history.

(56) References Cited

U.S. PATENT DOCUMENTS

| | | | | |
|---|---|---|---|---|
| 8,275,399 | B2* | 9/2012 | Karmarkar | H04M 1/72547 455/403 |
| 8,527,876 | B2* | 9/2013 | Wood | H04M 1/72544 375/354 |
| 8,719,729 | B2* | 5/2014 | Smith | G06F 3/0488 715/789 |
| 9,519,398 | B2* | 12/2016 | Wang | G06F 3/04817 |

(Continued)

FOREIGN PATENT DOCUMENTS

| | | |
|---|---|---|
| CN | 101458703 A | 6/2009 |
| CN | 103455562 A | 12/2013 |
| CN | 103455582 A | 12/2013 |

OTHER PUBLICATIONS

First Search dated Aug. 9, 2018, issued in related Chinese Application No. 201410851488.9 (1 page).

(Continued)

*Primary Examiner* — Reza Nabi
(74) *Attorney, Agent, or Firm* — Sheppard Mullin Richter & Hampton LLP

(57) ABSTRACT

Methods and apparatuses are provided for displaying a browser navigation page. The disclosed methods and apparatuses may generate a browser navigation page that have one or more icons displayed with preset areas at irregular positions in the browser navigation page. The disclosed methods and apparatuses may generate a browser navigation page in which the areas of the icons may be adjusted according to click counts of the icons.

16 Claims, 5 Drawing Sheets

(56) References Cited

U.S. PATENT DOCUMENTS

| | | | | |
|---|---|---|---|---|
| 9,753,998 B2* | 9/2017 | Bastide | ............ | G06F 17/30572 |
| 9,772,861 B2* | 9/2017 | DeLuca | ................ | G06F 9/453 |
| 9,836,551 B2* | 12/2017 | Diament | ........... | G06F 17/30716 |
| 9,836,552 B2* | 12/2017 | Diament | ........... | G06F 17/30716 |
| 9,910,917 B2* | 3/2018 | Bastide | ............ | G06F 17/30719 |
| 9,910,918 B2* | 3/2018 | Bastide | ............ | G06F 17/30719 |
| 2009/0158146 A1 | 6/2009 | Curtis et al. | | |
| 2009/0265611 A1 | 10/2009 | Sengamedu et al. | | |
| 2010/0036856 A1* | 2/2010 | Portilla | .................. | H04L 51/34 |
| 2010/0114789 A1* | 5/2010 | Dane | ..................... | G06Q 10/06 |
| | | | | 705/321 |
| 2010/0229082 A1* | 9/2010 | Karmarkar | ........ | H04M 1/72547 |
| | | | | 715/205 |
| 2010/0293270 A1* | 11/2010 | Augenstein | ........... | G06F 11/324 |
| | | | | 709/224 |
| 2010/0333029 A1* | 12/2010 | Smith | .................. | G06F 3/0486 |
| | | | | 715/834 |
| 2012/0042284 A1* | 2/2012 | Liesche | ............ | G06F 17/30014 |
| | | | | 715/834 |
| 2013/0179806 A1* | 7/2013 | Bastide | ............. | G06F 3/04817 |
| | | | | 715/760 |
| 2014/0129921 A1* | 5/2014 | Bergman | .............. | G06F 17/218 |
| | | | | 715/234 |
| 2014/0195950 A1* | 7/2014 | Diament | ........... | G06F 17/30958 |
| | | | | 715/771 |
| 2014/0215299 A1* | 7/2014 | Bellamy | ................ | G06F 17/20 |
| | | | | 715/211 |
| 2015/0193550 A1* | 7/2015 | Bastide | ................ | G06F 17/271 |
| | | | | 707/748 |
| 2015/0205830 A1* | 7/2015 | Bastide | ............ | G06F 17/30386 |
| | | | | 707/758 |
| 2015/0293990 A1* | 10/2015 | Bastide | ............ | G06F 17/30572 |
| | | | | 707/737 |
| 2016/0188166 A1* | 6/2016 | Wang | ................ | G06F 3/04817 |
| | | | | 715/745 |

OTHER PUBLICATIONS

First Office Action dated Aug. 20, 2018, issued in related Chinese Application No. 201410851488.9 (14 pages).

Liu Xiaojuan et al., "Visual Analysis of Hot Topics", *Journal of Modern Information*, vol. 33, No. 6, Jun. 2013 (7 pages).

* cited by examiner

US 10,126,912 B2

METHOD, APPARATUS, AND DEVICES FOR DISPLAYING BROWSER NAVIGATION PAGE

CROSS REFERENCE TO RELATED APPLICATION

This application claims priority to and benefits of Chinese Patent Application Serial No. 201410851488.9, filed with the State Intellectual Property Office of P. R. China on Dec. 30, 2014, which is incorporated herein by reference in its entirety.

TECHNICAL FIELD

The present disclosure relates to the field of Internet technology, and in particular, to methods, apparatus, and devices for displaying a browser navigation page.

BACKGROUND

With the development of the Internet, more and more various web sites having different functions have become convenient and fast information-exchange platforms. However, for web sites having similar functions, based on usage habit of a user and the degree of optimization of the web site, the user's click-through rates are not the same. For example, both serving as a search engine, "Baidu.com" in China has a relatively high click-through rate, while "Yahoo.com" has a relatively low click-through rate. Therefore, in order to facilitate the user, a browser may be provided with a navigation page for recommending web sites to the user. The web sites recommended by the browser navigation page may be selected according to the user's clicks experienced by the websites, ranging from high to low.

During the design of a conventional browser navigation page, a fixed number of website links are set to be displayed, and each website link is displayed or represented as one corresponding icon. The area occupied by each icon is fixedly equal, and the icons of the website links are displayed in the form of a nine-rectangle grid or a twelve-rectangle grid. However, according to a user's particular usage habits and nature of work, the user may have relatively higher click-through rates for some of the icons displayed, and relatively lower click-through rates for other icons displayed. Additionally, in a conventional displaying manner of the navigation page, the areas of the icons are fixed, which limits the icons with relatively higher click-through rates from being displayed in a prominent manner, and the user cannot make personalized settings on the icons with relatively higher click-through rates according to his or her own usage habits and requirements, thus leading to a poor user experience.

SUMMARY

Embodiments of the present disclosure are directed to methods, apparatus, and devices for displaying a browser navigation page. Various embodiments of the disclosure may include one or more of the following aspects.

One aspect of the present disclosure involves a method for displaying a browser navigation page. The method may include displaying one or more icons with preset areas at irregular positions in the browser navigation page. The method may also include adjusting the areas of the icons according to click counts of the icons. The method may also include acquiring a first icon and a second icon whose areas may have a difference of a preset pixel number from the icons displayed in the browser navigation page. A first area of the first icon may be greater than a second area of the second icon. The method may also include reading a first click count of the first icon and a second click count of the second icon. When the second click count is greater than the first click count, the method may further include adjusting the area of the second icon to the first area, and adjusting the area of the first icon to the second area. The method may also include periodically traversing the icons corresponding to the preset areas in accordance with a preset interval, and adjusting the area of an icon corresponding to the second area to the first area when an icon corresponding to the first area does not exist. The method may further include adjusting the area of the icon corresponding to the second area to the first area when the icon corresponding to the first area is deleted, or adjusting the area of the icon corresponding to the second area to the first area when an icon having an area larger than the first area is deleted and/or the area of the icon corresponding to the first area is adjusted. The method may also include receiving an opening command for opening the browser navigation page. The method may further include displaying a preset number of icons at preset positions according to the opening command. The areas of the icons may follow an arithmetic sequence having a preset pixel number as a sequence difference. The preset positions may be distributed in and/or may surround a central region of the navigation page. The method may also include receiving a moving command for moving an icon corresponding to a first area among the displayed icons. The method may further include moving the icon corresponding to the first area to a target region in the navigation page according to the moving command. When the area of the target region is smaller than the first area, the method may further include moving the icons surrounding the target region radially away from a center of the target region, until the icon corresponding to the first area does not substantially overlap with the icons surrounding the target region. The method may also include analyzing color values of background pixels of the navigation page. The method may further include reading a first color value possessed by a largest number of background pixels. The method may further include applying a second color value to the icons, the second color value having a difference of color level equal to or larger than a preset threshold from the first color value.

Another aspect of the present disclosure involves an apparatus for displaying a browser navigation page. The apparatus may include a displaying unit that displays one or more icons with preset areas at irregular positions in the browser navigation page. The apparatus may also include an adjusting unit that adjusts the areas of the icons according to click counts of the icons. The apparatus may also include an acquiring unit that acquires a first icon and a second icon, whose areas may have a difference of a preset pixel number, from the icons displayed in the browser navigation page. A first area of the first icon may be greater than a second area of the second icon. The apparatus may further include a reading unit that reads a first click count of the first icon and a second click count of the second icon. When the second click count is greater than the first click count, the adjusting unit may adjust the area of the second icon to the first area, and adjust the area of the first icon to the second area. The apparatus may also include a traversing unit that periodically traverses the icons corresponding to the preset areas in accordance with a preset interval. The adjusting unit may adjust the area of an icon corresponding to the second area to the first area when an icon corresponding to the first area does not exist. The adjusting unit may further adjust the area of the icon corresponding to the second area to the first area when the icon corresponding to the first area is deleted, or may adjust the area of the icon corresponding to the second area to the first area when the icon having an area larger than the first area is deleted and/or the area of the icon corresponding to the first area is adjusted. The apparatus may also include a receiving unit that receives an opening command for opening the browser navigation page. The displaying unit may display a preset number of icons at preset positions according to the opening command. The areas of the icons may follow an arithmetic sequence having a preset pixel number as a sequence difference. The preset positions may be distributed in and/or surround a central region of the navigation page. The apparatus may also include a receiving unit that receives an addition command for adding a new icon to be displayed. The apparatus may further include a setting unit that sets a click count of the new icon. The apparatus may further include an addition unit that adds the new icon with a preset minimum area to a preset position in the browser navigation page. The apparatus may also include an analysis unit that analyzes color values of background pixels of the navigation page. The apparatus may further include a reading unit that reads a first color value possessed by a largest number of background pixels. The apparatus may further include an application unit that applies a second color value to the icons, the second color value having a difference of color level equal to or larger than a preset threshold from the first color value.

Another aspect of the present disclosure involves a device for displaying a browser navigation page. The device may include a non-transitory memory storing instructions. The device may also include one or more processors that execute the stored instructions to cause the device to perform operations. The operations may include configuring a displaying unit to display one or more icons with preset areas at irregular positions in the browser navigation page. The operations may also include configuring an adjusting unit to adjust the areas of the icons according to click counts of the icons. The operations may also include acquiring a first icon and a second icon, whose areas have a difference of a preset pixel number, from the icons displayed in the browser navigation page. A first area of the first icon may be greater than a second area of the second icon. The operations may further include reading a first click count of the first icon and a second click count of the second icon. When the second click count is greater than the first click count, the operations may further include adjusting the area of the second icon to the first area, and adjusting the area of the first icon to the second area. The operations may further include periodically traversing the icons corresponding to the preset areas in accordance with a preset interval, and adjusting the area of an icon corresponding to the second area to the first area when an icon corresponding to the first area does not exist. The operations may further include adjusting the area of the icon corresponding to the second area to the first area when the icon corresponding to the first area is deleted, or adjusting the area of the icon corresponding to the second area to the first area when the icon having an area larger than the first area is deleted and/or the area of the icon corresponding to the first area is adjusted. The operations may also include receiving an opening command for opening the browser navigation page. The operations may further include displaying a preset number of icons at preset positions according to the opening command. The areas of the icons may follow an arithmetic sequence having a preset pixel number as a sequence difference. The preset positions may be distributed in and/or surround a central region of the navigation page. The operations may also include receiving an addition command for adding a new icon to be displayed. The operations may further include setting a click count of the new icon. The operations may further include adding the new icon with a preset minimum area to a preset position in the browser navigation page. The operations may also include receiving a moving command for moving an icon corresponding to a first area among the displayed icons. The operations may further include moving the icon corresponding to the first area to a target region in the navigation page according to the moving command. When the area of the target region is smaller than the first area, the operations may further include moving the icons surrounding the target region radially away from a center of the target region, until the icon corresponding to the first area does not substantially overlap with the icons surrounding the target region. The operations may also include analyzing color values of background pixels of the navigation page. The operations may further include reading a first color value possessed by a largest number of background pixels. The operations may further include applying a second color value to the icons, the second color value having a difference of color level equal to or larger than a preset threshold from the first color value.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

Icons of a conventional browser navigation page are displayed in the form of a nine-rectangle grid or a twelve-rectangle grid, for example. Although the user may be allowed to add, delete, and change the positions of the icons, the styles and areas of the icons are fixed, which not only fails to give an aesthetic appearance, but also fails to achieve a flexible adjustment according to user's usage state, e.g., frequency of using a website. Further, the colors of the icons cannot be changed along with the change of a background of the navigation page. Such plain displaying form may cause an aesthetic fatigue to the user after a long-term use, as well as a poor user experience. Therefore, there exists a need for a method and an apparatus for displaying a browser navigation page.

Reference will now be made in detail to the disclosed embodiments, examples of which are illustrated in the accompanying drawings. Wherever convenient, the same reference numbers will be used throughout the drawings to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. The materials, methods, and examples are illustrative only and are not intended to be necessarily limiting.

While the present disclosure is described herein with reference to illustrative embodiments of particular applications, such as devices, methods, and systems for displaying a browser navigation page, it is understood that the embodiments described herein are not limited thereto. Those having ordinary skill in the art and access to the teachings provided herein will recognize additional modifications, applications, embodiments, and substitution of equivalents that all fall within the scope of the present disclosure. For example, the devices and methods of the present disclosure may be employed for any suitable application, including, but not limited to, displaying a navigation page of icons and/or icons that represent website links and/or software applications. Devices disclosed herein can also be used with other suitable methods for displaying a navigation page. Such devices may include, but are not limited to, a general-purpose computer, a computer cluster, a terminal, a mainframe, a mobile computing device, or any other computing device capable of connecting to a network. As an additional example, a mobile computing device may include, but is not limited to, a cell phone, a smart phone, a personal digital assistant, a tablet, or a laptop. Accordingly, the disclosure is not to be considered as limited by the foregoing or following descriptions.

Figure 1:
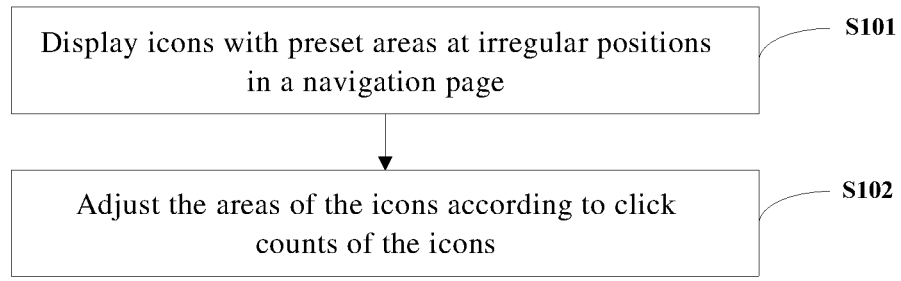
FIG. 1 depicts a flowchart illustrating an exemplary method for displaying a browser navigation page, according to embodiments of the present disclosure.

FIG. 1 depicts a flowchart illustrating an exemplary method 100 for displaying a browser navigation page, according to embodiments of the present disclosure. Method 100 may include one or more steps as described in the following.

Step S101: Display one or more icons with different preset areas at irregular positions.

In step S101, when a user opens the navigation page for the first time, method 100 may display a preset number of icons with preset areas in a browser. At an initial state, the preset number of icons may be selected according to a history of click counts and/or click-through rates of the icons or website links by the user. In some embodiments, a maximum area and a minimum area may be preset for the icons, and intermittent areas between the maximum area and the minimum area may also be determined for the icons. For example, by taking the maximum area as a maximum value, the intermittent areas may be set as an arithmetic sequence having a preset pixel number as a sequence difference of the successive areas.

As described herein, a click count of an icon may refer to the number of clicks or the number of times of clicking received by the icon during a period of time, e.g., an hour, a day, a week, a month, or a year. The click count of an icon may indicate a frequency of clicks received by an icon. The click count of an icon may be manually set to a value or automatically preset to a default value. In some embodiments, a click count of an icon may refer to a total number of clicks received by the icon after an initial opening of the navigation page.

The preset number of the icons, the maximum area and the minimum area of the icons, and the preset pixel number may be flexibly set based on the user's experience. For example, at the initial state, eleven icons may be preset for being displayed, in which the maximum area of the icons may be of about 300 pixels, the minimum area may be of about 100 pixels, and the preset pixel may range from about 30 to 50 pixels.

When the icons are to be displayed, a default click count may be set for each icon according to a record of the icon's click count. Each icon may correspond to one default click count, and an icon corresponding to a greater default click count may be displayed with a greater area, e.g., with a larger number of pixels. In other embodiments, the default click counts of all the icons to be displayed may be set to zero, and all the icons are displayed in a sequence (either preset or random). In such instances, the icon displayed first may have the maximum area, and the following icons displayed in the sequence may have progressively decreased areas in accordance with the displaying sequence.

In order to avoid overlapped or substantially overlapped displaying of the icons, for example, by about 50% to 100%, each icon may be displayed at one corresponding preset position. The preset positions of the icons may be determined through coordinates. For example, in order to make it easier for a user to browse, the preset position of the first icon may be in a middle region of the navigation page, and the preset positions of other icons may be distributed in and/or extend to surrounding regions centering on the middle region of the navigation page. In such instances, the icons may be considered as being displayed at irregular positions as compared to the positions set in a nine-rectangle grid or a twelve-rectangle grid in the conventional displaying manners. As described herein, the irregular positions of the displayed icons may refer to a disorganized, out-of-order, adaptable, flexible, and/or adjustable layout of the icons in the navigation page. Thus, method 100 may change the existing habits for setting the positions of the icons. Moreover, in some embodiments, the area of the icon may be set as any random, regular, or irregular geometric shape, such as a round, circular, elliptical, triangular, rectangular, pentagonal, hexagonal, octagonal, or decagonal shape.

In some embodiments, the icons of the navigation page may have areas different from each other, and may have displaying positions and shapes different from those of the conventional displaying manners. Such differences break through the conventional displaying pattern of the navigation page and have a novel, convenient, and aesthetic displaying style, thus improving the user experience.

Step S102: Adjust the areas of the icons according to click counts of the icons.

Parameters, such as the area, click count, link content (e.g., website address represented by the icon), and displaying position, of each of the icons displayed in the navigation page are all stored in a database. The icons whose areas have a difference of a preset pixel number can be acquired from the stored areas in the database. In this step, two icons whose areas have a difference of the preset pixel number can be acquired from the database, for example, as shown with respect to FIG. 5 and described in detail below.

Figure 5:
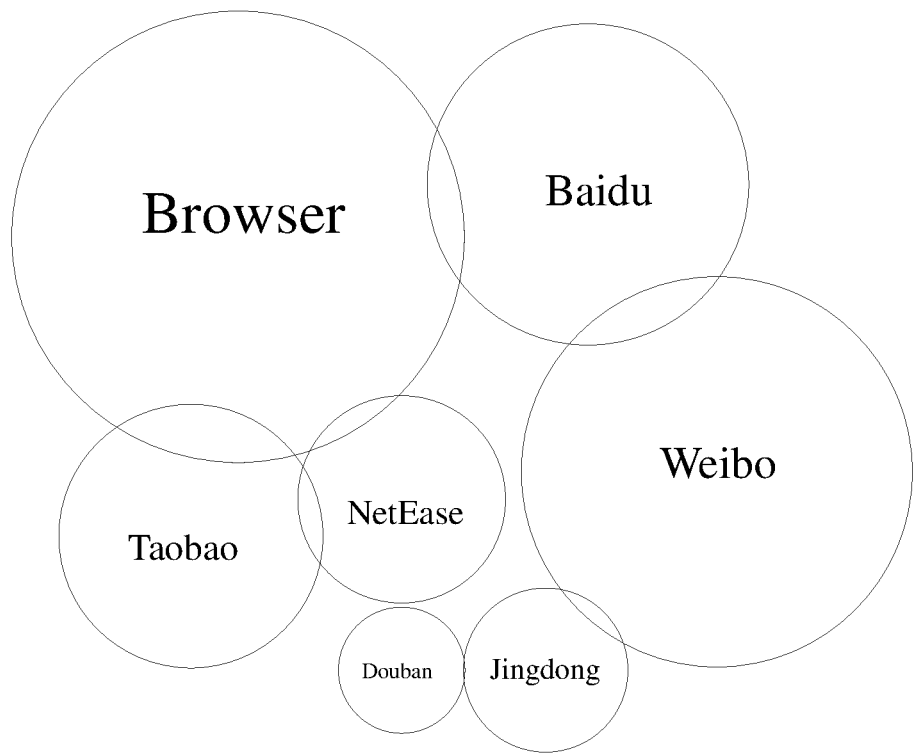
FIG. 5 depicts a schematic diagram illustrating an exemplary browser navigation page, according to embodiments of the present disclosure.

FIG. 5 depicts a schematic diagram illustrating an exemplary browser navigation page. In order to facilitate description, when the icons shown in FIG. 5 are cited in the later description and illustration, the name of an icon is used for reference to the icon, which is illustrated in this example.

As shown in FIG. 5, the icons have round shapes. The icon "Baidu" and the icon "Taobao" are two icons whose areas have a difference of a preset pixel number. As described herein, the icon "Baidu" is referenced as a first icon, the area of which is determined as a first area, and the icon "Taobao" is referenced as a second icon, the area of which is determined as a second area, the first area being larger than the second area.

After the first icon and the second icon are determined, an identifier (e.g., an address in the database or a unique number) of the first icon is searched in a database, and the current click count corresponding to the identifier is read as a first click count. The method for reading a second click count is the same as the method for reading the first click count, which is not repeated in detail herein. The identifier corresponding to the icon may be a unique number set for the icon during the storage. Any suitable identifier may also be used for identifying the icon.

If the navigation page is opened or used for the first time, the first click count may be equal to the second click count during a first time of reading or acquiring of the click counts. If the navigation page is not opened for the first time, the first click count may be greater than the second click count or vice versa. As shown in this example, the current click count of "Baidu" is 1000 times, and the current click count of "Taobao" is 800 times, which means that the first click count is 1000 times, and the second click count is 800 times.

In order to increase displaying forms of the icons in the navigation page, the first and second icons may be adjusted based on whether the read second click count is greater than that of the first click count. If the second click count is less than or equal to the first click count, adjustment of the icons is not required. The reading of the current first click count and second click count may go on, and may be repeated periodically, for example. When the second click count is greater than the first click count, it indicates that the user more often clicks on the second icon, for example, during a recent period of time, and in order to make the second icon be displayed in a more prominent way, adjustment of the icons is made to at least the second icon and/or the first icon.

When the browser is in use, different pages may be opened by clicking the icons, and every time an icon is clicked, the click count of the corresponding icon is increased by 1 to become a new current click count. Therefore, the first click count and the second click count may not remain unchanged, and may be updated according to the click counts of the icons by the user. This means that the values of the first click count and second click count read each time may be different from the values read last time.

For example, as shown in FIG. 5, the current click count of "Baidu" is 1000 times, the current click count of "Taobao" is 800 times. From the current click counts, if the user browse "Taobao" for less times due to the recent busy work schedule, the click count of "Taobao" read each time may be smaller than the click count read of "Baidu." In this situation, the current displaying mode of the icons in the navigation page may be maintained, and the click counts of "Taobao" and "Baidu" may be repeatedly read.

When the second click count exceeds the first click count, it indicates that the frequency of clicking on the second icon by the user is relatively higher. Therefore, the second icon should be made more prominent so that the user can identify the icon more quickly. For example, when the second click count is greater than the first click count, the area of the second icon is adjusted to the first area, and the area of the first icon is adjusted to the second area, so that the second icon is made more prominent by being displayed with a larger area.

The click-through rates and/or click counts on different icons may be different based on the different states of life of the user. Therefore, even if the area of the second icon is adjusted to the first area and the area of the first icon is adjusted to the second area currently, with the relatively increasing number of times of the user's clicking on the first icon (e.g., the first click count becomes greater than the second click count), the area of the first icon may be re-adjusted to an area larger than the second area, such as the first area, and/or the area of the second icon may be re-adjusted to an area smaller than the first area, such as the second area.

For example, as shown in FIG. 5, the area of "Baidu" includes 240 pixels, and the area of "Taobao" includes 210 pixels currently. When commodities are on sale at discounted prices in a sales season owing to an upcoming festival, for example, the click count or the number of times of the user's clicking on "Taobao" may be increased, and when the click count of "Taobao" reaches 1001, the area of "Taobao" is adjusted to 240 pixels, and the area of "Baidu" is adjusted to 210 pixels. After the festival, when the user is busy with work, the click count or the number of times of clicking on "Baidu" may be increased (e.g., for searching work-related information), and when the click count of "Baidu" exceeds that of "Taobao" once again, the area of "Baidu" is adjusted to 240 pixels, and the area of the "Taobao" is adjusted to 210 pixels.

As described herein, in order to facilitate a clear description, two icons of the icons displayed in the navigation page are taken as examples for illustration. The navigation page may include a number of icons, the adjusting process of which is similar to that of the two icons as described above and is not repeated herein.

As described above, method 100 for displaying the browser navigation page may set the area of the displayed icon according to the click count, so that the icon having a greater click count may have a larger area, and the icon having a smaller click count may have a smaller area. When the click count or the number of times of the user's clicking on a certain icon is relatively increased compared to the click count of another icon, the areas of the icons in the navigation page may be automatically adjusted according to the statistics (e.g., values) on the click counts, so as to make at least one of the icons having a relatively greater click count more prominent. Thus, method 100 not only has a variety of displaying forms, but also can improve the user experience.

In addition, after a certain icon is deleted from a conventional navigation page, the region corresponding to the deleted icon is emptied, and other icons are not changed, resulting in a waste of displaying space of the navigation page. To solve such a problem and to make the display of the icons in the navigation page more humanized and personalized, FIG. 2 depicts a flowchart illustrating an exemplary method 200 for displaying a browser navigation page, according to the embodiments of the present disclosure.

Method 200 may include one or more steps of method 100. Therefore, as described herein, for the part of description in method 200 that is substantially the same as that in method 100, reference will be made to the relevant description in method 100, and this part will not be repeated in the following description.

Figure 2:
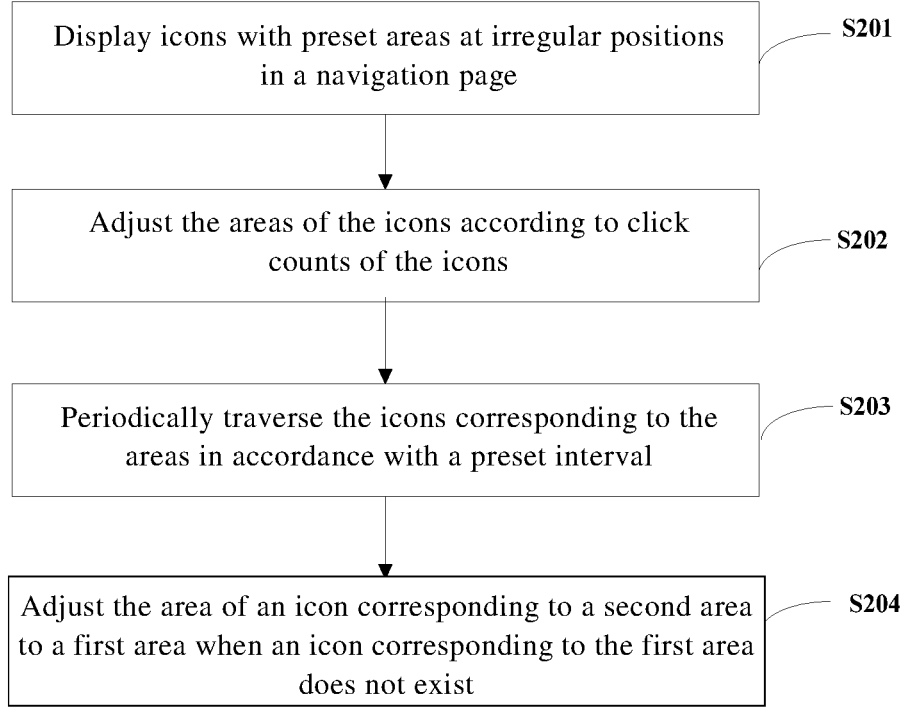
FIG. 2 depicts a flowchart illustrating an exemplary method for displaying a browser navigation page, according to embodiments of the present disclosure.

As shown in FIG. 2, method 200 may include one or more steps as described in the following.

Step S201: Display icons with different preset areas at irregular positions.

The irregular positions may be preset, and may be different from the positions in the nine-rectangle grid or twelve-rectangle grid. For example, the preset position of the first icon may be set in a middle region of the navigation page, and the preset positions of other icons may be distributed in and/or extend to surrounding regions centering on the middle region of the navigation page. The operations in step S201 may be substantially similar to those described in step S101.

Step S202: Adjust the areas of the icons according to click counts of the icons. The operations in step S202 may be substantially similar to those described in step S102.

Step S203: Periodically traverse the icons corresponding to the areas in accordance with a preset interval to detect at least one icon that is deleted.

As described above, information or parameters of the displayed icons (e.g., the area, click count, link content, and displaying position) are stored in a database, e.g., the cloud or a computing center. Each icon corresponds to a unique identifier in the database, and each area may correspond to an identifier. The deleted icons are searched out by periodically traversing the identifiers in the database, so as to adjust the areas of the icons in the navigation page in a timely manner.

Due to a limited page size of the navigation page, for example, by the size of a screen display, the number of icons that can be displayed is also limited. For example, the number of displayed icons may be from 9 to 12. Therefore, the amount of data traversed in the database is relatively small. In order to improve the efficiency of adjusting the icons, and/or to detect that an icon is deleted at an earliest time, an interval for the periodic traversing may be less or far less than the amount of time for executing the icon deletion. In some embodiments, the interval of the periodic traversing may be flexibly set to any suitable amount of time based on the length of time for executing the icon deletion.

Step S204: Adjust the area of the icon corresponding to the second area to the first area when the icon corresponding to the first area does not exist.

When it is detected that the icon corresponding to the first area is deleted or does not exist, in order to increase utilization of the navigation page, and/or to make other icons be displayed in a more intuitive or prominent manner, the area of the icon having the second area may be adjusted to the first area.

After the icon having the second area is adjusted to have the first area, if an icon to be adjusted to have the second area does not exist, for example, the second area is the minimum area of the icons displayed in the navigation page, no further adjustment is made. If the second area is not the minimum area among the icons displayed in the navigation page, then the icon having a third area smaller than the second area by a preset pixel number is adjusted to the second area. If icons having smaller areas than the third area are also displayed, then the smaller areas of these icons are sequentially increased by the preset pixel number.

For example, as shown in FIG. 5, if "Baidu," which has an area of 240 pixels, is deleted, the icon having an area of 240 pixels does not exist in the database. At this time, the areas of the icons, such as "Taobao," "NetEase," "Jingdong," and "Douban", each of which has an area of less than 240 pixels, are all increased by 30 pixels in sequence. In some instances, if "Jingdong" is deleted, because "Douban" has an area smaller than that of "Jingdong," the area of "Douban" is increased, e.g., to the area of the deleted "Jingdong." In other instances, if "Douban" is deleted, because "Douban" is the icon having the minimum area in the navigation page, no adjustment is made to the areas of the other icons.

As described above, if an icon is deleted, one or more of the areas of the icons displayed in the navigation page and having areas smaller than the area of the deleted icon may be increased, so as to make the icons with the adjusted or increased areas occupy or substantially occupy the space generated from the deleted icon. In such instances, the utilization of the space of the navigation page may be increased, and the icons having a relatively small area can be made larger and thus more prominent. Such varied and/or flexible displaying form of the navigation page not only is more humanized and personalized, but also can improve the user experience.

Additionally or alternatively, embodiments according to the present disclosure may include a method for adding a new icon. This manner is different from the conventional method for adding the new icon to a displaying region at a fixed size, for example. The addition of a new icon is described in detail below with respect to FIG. 3.

Figure 3:
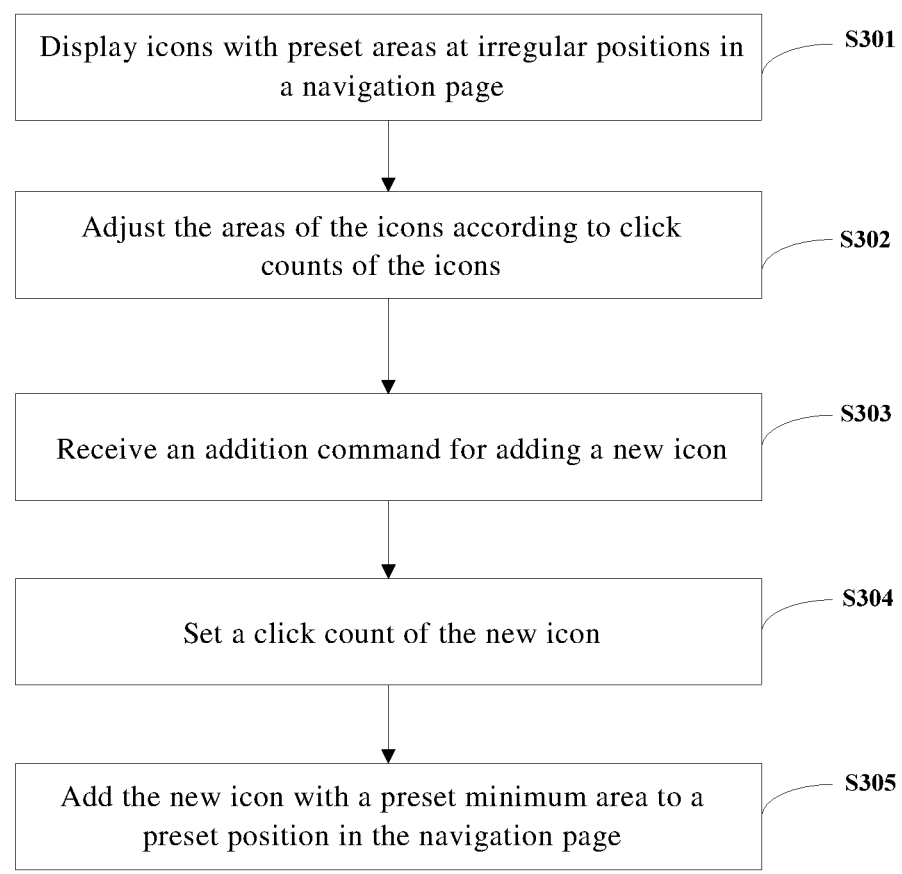
FIG. 3 depicts a flowchart illustrating an exemplary method for displaying a browser navigation page, according to embodiments of the present disclosure.

FIG. 3 depicts a flowchart illustrating an exemplary method 300 for displaying a browser navigation page. Method 300 may include one or more steps of method 100 or method 200. In some embodiments, steps of method 300 may be selectively combined with one or more steps of method 100 or method 200. Therefore, in order to avoid repeated description, for the part of description in method 300 that is the same as that of method 100 or method 200, reference will be made to the relevant description in method 100 or method 200, and this part will not be repeated in the following description.

As shown in FIG. 3, method 300 may include one or more steps as described in the following.

Step S301: Display icons with different preset areas at irregular positions. The operations in step S301 may be substantially similar to those described in step S101 or step S201.

Step S302: Adjust the areas of the icons according to click counts of the icons. The operations in step S302 may be substantially similar to those described in step S102 or step S202.

Step S303: Receive an addition command for adding a new icon.

As described above, the number of the icons displayed in the navigation page may be preset during the initial opening of the navigation page. The number of the icons currently displayed in the navigation page may be smaller than the preset number. For example, the navigation page as shown in FIG. 5 may be preset to display 12 icons, but only 7 icons are displayed currently, so that new icons may be added as needed.

When a new icon is added, an addition command is generated by clicking on an addition symbol on the screen, in the browser, and/or in the navigation page. A computing device, such as a server, a mobile device, a workstation, a desktop, a graphics card, or an embedded system, after receiving the addition command, may suggest icons other than the displayed icons to the user based on a record of the click counts of these icons. For example, the record of the click counts of these icons may be previously generated before these icons were removed or may be set at default values. Then, the user may choose the new icon to be added from the suggested icons. If the new icon to be added by the user is not provided in the suggested icons, the new icon may be added by receiving a website address, e.g., a URL, from the user.

In some embodiments, if the number of icons has been displayed in the navigation page reaches the preset number, the addition symbol may disappear or be hidden, and the user may not add a new icon. Conventional technologies for making the addition symbol disappear or hiding the additional symbol can be used. These are not described herein.

Step S304: Set a click count of the new icon.

When the addition command to add the new icon is received, in order to facilitate management of the new icon, a server, for example, sets a default click count for the new icon. As the new icon has not been clicked by the user since the addition, in order to prevent the displaying area of the new icon from being substantially close to or the same as one of the areas of the displayed icons, in some embodiments, the default click count of the new icon is set to 0.

Step S305: Add the new icon with a preset minimum area to a preset position for displaying.

Because the areas of the displayed icons range from a preset maximum value down to a preset minimum value, if the area of the new icon is set as a value between a maximum area and a minimum area, it is possible for the area of the new icon to be close to or substantially the same as one of the areas of the displayed icons. In such situation, during the addition of the new icon, calculation needs to be performed to adjust the icons having similar or the same areas as that of the new icon, thereby causing additional operations.

To reduce or eliminate the above additional operations, the area of the new icon is set as the preset minimum area, and because of the small size of this area, in order to emphasize it and make it easier for the user to view, the displaying position of the new icon is set at a fixed position.

Because the icons that have been displayed are mostly displayed in the middle region or regions surrounding the middle region of the navigation page, in order to emphasize the newly added icon, the displaying position of the new icon is set to be at any corner of the navigation page, and the position may be represented by coordinates.

The method described above for adding a new icon, even when the area of the added new icon is the preset minimum area, may still highlight the new icon, thereby making the navigation page more personalized.

Based on the description above, the area of a certain icon that is located at the region of an edge or a certain corner of the navigation page, e.g., a newly added icon, may grow along with the user's usage, e.g., click count of the icon. When the area of this icon has grown to a certain extent, it may affect the user's clicking on the icon and/or other icons displayed. Thus, in some embodiments of the present disclosure, a method for moving the icon is provided as described in detail below with respect to FIG. 4.

Figure 4:
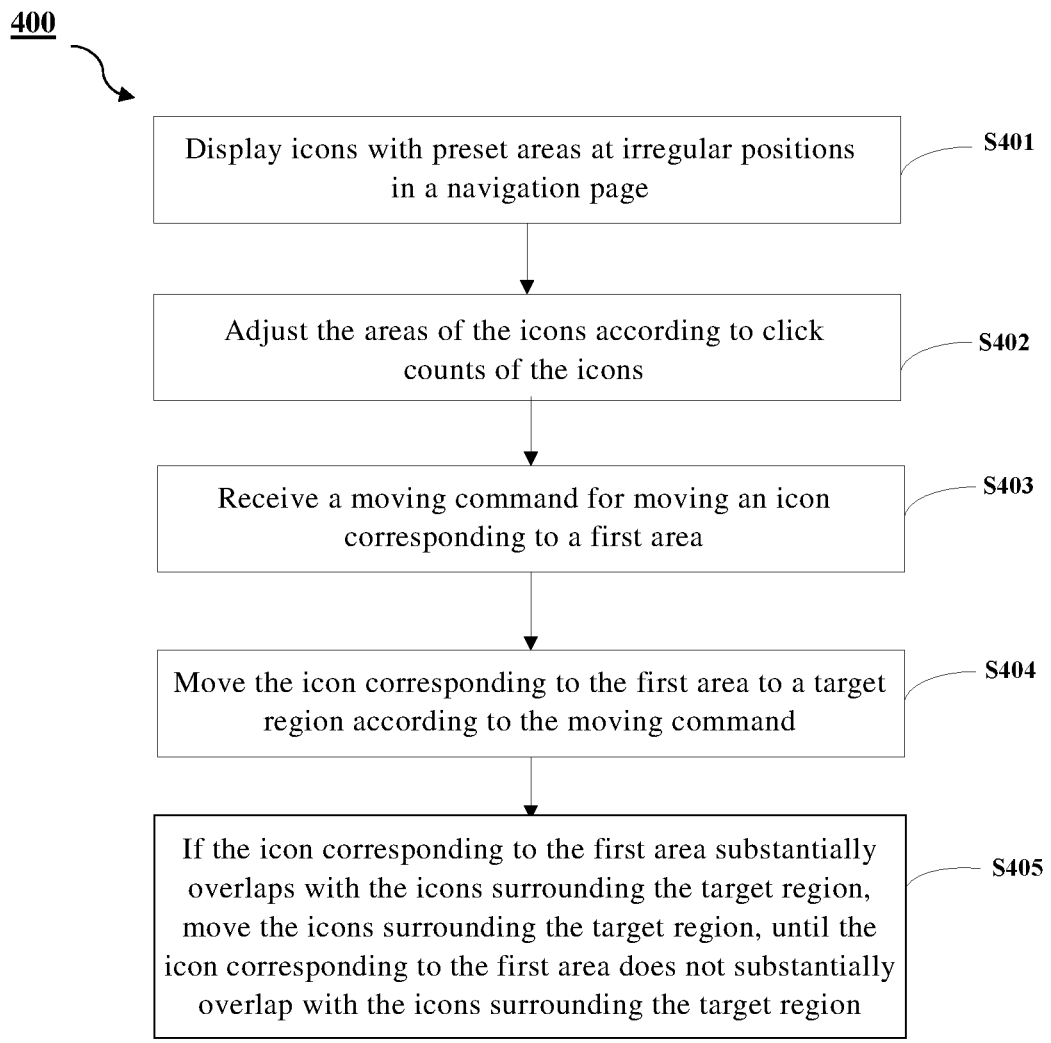
FIG. 4 depicts a flowchart illustrating an exemplary method for displaying a browser navigation page, according to embodiments of the present disclosure.

FIG. 4 depicts a flowchart illustrating an exemplary method 400 for displaying a browser navigation page. As shown in FIG. 4, method 400 may include one or more steps as described in the following.

Step S401: Display icons with different preset areas at irregular positions. The operations in step S401 may be substantially similar to those described in step S101, step S201, or step S301.

Step S402: Adjust the areas of the icons according to click counts of the icons. The operations in step S402 may be substantially similar to those described in step S102, step S202, or step S302.

Step S403: Receive a moving command for moving the icon corresponding to the first area to a target region.

Based on the above description, taking FIG. 5 as an example, the area of "Baidu" is used here as a first area. When "Baidu" is selected and/or clicked for an amount of time longer than a threshold (for example, a mouse pointer or a finger may be held pressing on "Baidu" for an amount of time), a command of selecting "Baidu" is generated and/or sent to a server, for example. When "Baidu" is being selected, dragged, and/or moved in the navigation page, a moving command is generated and applied to "Baidu," for example, by the server. When "Baidu" is selected and/or dragged to a certain region, and then released, the certain region is a target region of "Baidu."

Step S404: Move the icon corresponding to the first area to the target region according to the moving command.

The target region may be a random region in the navigation page. The icon selected to be moved may be moved to the target region according to the usage habits of the browser's user, for example. In some embodiments, when other icons are displayed where the icon is to be moved, a region among the displayed icons is set as the target region. For example, as shown in FIG. 5, if "Baidu" is to be moved to among "NetEase," "Jingdong," "Weibo," and "Douban," the region among "NetEase," "Jingdong," "Weibo," and "Douban" is set as the target region.

Step S405: When the area of the target region is smaller than the first area, move the icons surrounding the target region radially away from the center of the target region, until the icon corresponding to the first area does not overlap or substantially overlap with the icons surrounding the target region.

For example, as shown in FIG. 5, if the target region is among "NetEase," "Jingdong," "Weibo," and "Douban," the area of the target region is smaller than the area of "Baidu." If "Baidu" is moved to the target region, it may overlap with the other four icons, causing inconvenience for the users' clicking and affecting the use of the navigation page.

In order to solve the above problem, in some embodiments, the coordinates of the center of the target region is read from the navigation page, and "NetEase," "Jingdong," "Weibo," and "Douban" are radially moved away from the coordinates of the center of the target region, until "Baidu" does not overlap or substantially overlap with "NetEase," "Jingdong," "Weibo," and "Douban."

As shown in FIG. 5, the icons may have round shapes. Whether the icon to be moved may overlap with another icon near or surrounding the target region may be determined, for example, by comparing the distance between the centers of these two icons to the sum of the radii of these two icons. For example, by respectively comparing each of the distances between the coordinates of the center of "Baidu" and the coordinates of the centers of "NetEase," "Jingdong," "Weibo," and "Douban" to sums of the radii of "Baidu" and "NetEase," "Baidu" and "Jingdong," "Baidu" and "Weibo," and "Baidu" and "Douban", whether "Baidu" overlaps with the "NetEase," "Jingdong," "Weibo," and/or "Douban" may be determined.

For example, when the distance between the coordinates of the center of "Baidu" and the coordinates of the center of "NetEase" is smaller than the sum of the radii of "Baidu" and "NetEase," it indicates that "Baidu" partially overlaps with "NetEase". When the distance between the coordinates of the center of "Baidu" and the coordinates of the center of "NetEase" is equal to the sum of the radii of "Baidu" and "NetEase," it indicates that "Baidu" is closely adjacent to or borders "NetEase," but does not overlap with "NetEase." When the distance between the coordinates of the center of "Baidu" and the coordinates of the center of "NetEase" is larger than the sum of the radii of "Baidu" and "NetEase," it indicates that "Baidu" does not overlap with "NetEase." The method for determining whether "Baidu" overlaps with the other icons shown in FIG. 5 may be substantially the same.

In other embodiments, the icons may have other geometric shapes. The method for calculating whether the icon to be moved, e.g., "Baidu," may overlap with other icons adjacent or surrounding the target region, e.g., "NetEase," "Jingdong," "Weibo," and "Douban," may be similar as described above.

The method for moving an icon in a navigation page as described above may not be limited by the position of the icon to be moved and/or the target region to which the icon is moved. The icons may be automatically adjusted in a flexible manner according to the area of the target region, e.g., by being automatically moved radially away from the target region to reduce the amount of overlapping, so as to achieve a novel style and more personalized user experience.

In some embodiments, the colors of the icons may be adaptively adjusted according to a change of the background color of the navigation page, thereby achieving a variety of displaying forms. For example, when the wallpaper of the navigation page is changed, the color values (e.g., RGB values or grayscale values) of the background pixels of the navigation page may be read, analyzed, and/or determined, e.g., by a server, a graphics card, or a computing device. Then a first color value possessed by a largest number of the background pixels is determined, and a second color value that differs or substantially differs from the first color value is applied for displaying one or more of the icons. For instance, the color value applied to the icons may correspond to a color whose color level or grayscale level has a difference from the color corresponding to the first color value, and the difference may be equal to or larger than a preset threshold.

As described above, the icons may be displayed with different areas at irregular positions in the browser navigation page. This is different from the conventional displaying manner of the icons in the navigation page, not only in the different areas of the icons, but also in the different layout of the icons. Moreover, the areas of the icons may be adjusted according to the click counts of the icons. The areas for the displayed icons in the navigation page may be set according to the click counts, e.g., a greater click count corresponding to a larger area, and a smaller click count corresponding to a smaller area. As the number of times of the user's clicking or the click count of a certain icon is relatively increased while the click count of another icon is relatively decreased, the navigation page can automatically adjust the areas of the icons according to the statistics, e.g., values, of the click counts, so as to display the icons having relatively greater click counts by the user in a more prominent way, leading to a variety of displaying forms as well as an improvement to the user experience.

Figure 6:
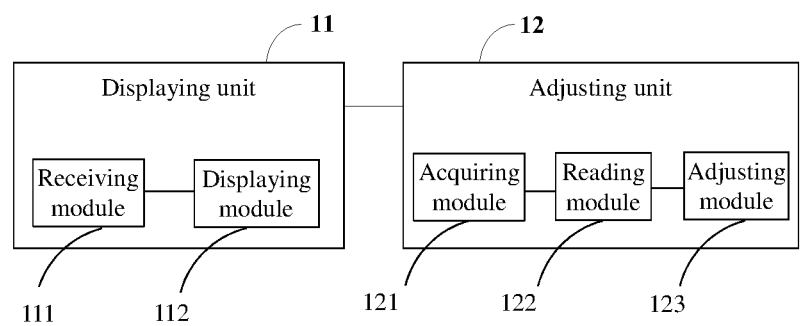
FIG. 6 depicts a block diagram illustrating an exemplary apparatus for displaying a browser navigation page, according to embodiments of the present disclosure.

Corresponding to the methods described above, in some embodiments of the present disclosure, an apparatus for displaying a browser navigation page is provided, as shown in FIG. 6, which depicts a block diagram illustrating an exemplary apparatus 10 for displaying a browser navigation page. Apparatus 10 may include a displaying unit 11 and an adjusting unit 12. The displaying unit 11, such as a screen display, is configured to display icons with different preset areas at irregular positions; and adjusting unit 12 is configured to adjust the areas of the icons according to the click counts of the icons displayed by displaying unit 11.

In some embodiments, adjusting unit 12 may include an acquiring module 121, a reading module 122, and an adjusting module 123. Acquiring module 121 may be configured to acquire, e.g., from the navigation page, a first icon and a second icon, whose areas may have a difference of a preset pixel number. A first area of the first icon may be larger than a second area of the second icon. Reading module 122 may be configured to read a first click count of the first icon and a second click count of the second icon. Adjusting module 123 may be configured to adjust the area of the second icon to the first area after the second click count becomes greater than the first click count, and may be further configured to adjust the area of the first icon to the second area.

Displaying unit 11 may include a receiving module 111 and a displaying module 112. Receiving module 111 may be configured to receive a browser navigation page opening command. Displaying module 112 may be configured to display a preset number of icons with different areas at preset positions according to the opening command received by receiving module 111. The different areas of the icons may be set according to an arithmetic sequence taking a preset pixel number as a sequence difference. The preset positions of the icons may be distributed in a central region and/or surrounding regions centering on the central region of the navigation page.

The implementation of the steps and functions of each unit and/or module in apparatus 10 may be referred to the corresponding steps of the exemplary methods described above, and thus not repeated herein.

As described above, the icons of the navigation page displayed by apparatus 10 may have areas different from each other, and may have displaying positions and/or shapes different from those of the conventional regular displaying manner, breaking through the conventional navigation page displaying layout and having a novel style, thus improving the user experience.

Figure 7:
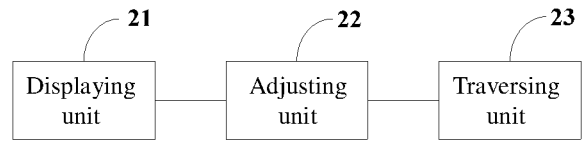
FIG. 7 depicts a block diagram illustrating an exemplary apparatus for displaying a browser navigation page, according to embodiments of the present disclosure.

FIG. 7 depicts a block diagram illustrating an exemplary apparatus 20 for displaying a browser navigation page. Apparatus 20 may include a displaying unit 21 and an adjusting unit 22. Apparatus 20 may further include a traversing unit 23 configured to periodically traverse the icons corresponding to all the areas according to a preset interval. The steps and functions of displaying unit 21 and the adjusting unit 22 are similar to those of displaying unit 11 and adjusting unit 12 of apparatus 10, and thus are not repeated herein.

Adjusting unit 22 may be further configured to adjust the area of the icon corresponding to the second area to the first area when the icon corresponding to the first area does not exist. For example, adjusting unit 22 is configured to, when the icon corresponding to the first area is deleted, adjust the area of the icon corresponding to the second area to the first area; or, when the icon having an area larger than the first area is deleted and/or the area of the icon corresponding to the first area is increased or decreased, adjust the area of the icon corresponding to the second area to the first area.

In some embodiments, if an icon is deleted, one or more of the areas of the icons displayed in the navigation page and having areas smaller than the area of the deleted icon may be increased, such that the icons with the increased areas may occupy or substantially occupy the space generated from the deleted icon. In such instances, the utilization of the space of the navigation page may be increased, and the icons having relatively small areas may be made larger and thus more prominent. Such varied and/or flexible displaying layout of the navigation page not only is more humanized and personalized, but also can improve the user experience.

Figure 8:
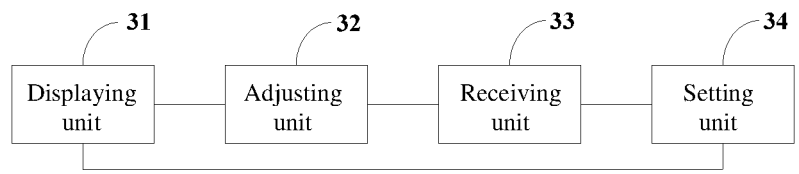
FIG. 8 depicts a block diagram illustrating an exemplary apparatus for displaying a browser navigation page, according to embodiments of the present disclosure.

FIG. 8 depicts a block diagram illustrating an exemplary apparatus 30 for displaying a browser navigation page. Apparatus 30 may include a displaying unit 31 and an adjusting unit 32. As shown in FIG. 8, apparatus 30 may further include a receiving unit 33 and a setting unit 34. Receiving unit 33 may be configured to receive an addition command for adding a new icon. Setting unit 34 may be configured to set a click count of the new icon. The steps and functions of displaying unit 31 and adjusting unit 32 are similar to those of displaying unit 11 and adjusting unit 12 of apparatus 10, and thus are not repeated herein.

In some embodiments, displaying unit 32 may be further configured to add the new icon with a preset minimum area to a preset position in the navigation page.

Figure 9:
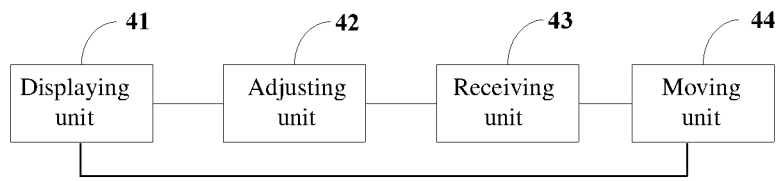
FIG. 9 depicts a block diagram illustrating an exemplary apparatus for displaying a browser navigation page, according to embodiments of the present disclosure.

As described above, the icons in the navigation page may be moved according to the user's needs and habits. FIG. 9 depicts a block diagram illustrating an exemplary apparatus 40 for displaying a browser navigation page. With respect to FIG. 9, apparatus 40 may include a displaying unit 41, an adjusting unit 42, a receiving unit 43, and a moving unit 44. The steps and functions of displaying unit 41 and adjusting unit 42 are similar to those of displaying unit 31 and adjusting unit 32. The steps and functions of receiving unit 43 may include those of receiving unit 33 of apparatus 30. Receiving unit 43 may be further configured to receive a moving command for moving the icon corresponding to the first area to the target region. Moving unit 44 may be configured to move the icon corresponding to the first area to a target region according to the moving command received by receiving unit 43.

In some embodiments, when the area of the target region is smaller than the first area, moving unit 44 may be further configured to move the icons surrounding the target region radially away from the center of the target region, until the icon corresponding to the first area does not overlap or substantially overlap with the icons surrounding the target region.

Apparatuses 10, 20, 30, and/or 40 may further include an analysis unit, a reading unit, and an application unit. The analysis unit may be configured to analyze color values of the background pixels of the navigation page. The reading unit may be configured to read a first color value possessed by a largest number of the background pixels. The application unit may be further configured to apply a second color to one or more icons. The second color may have a color value that has a difference equal to or larger than a preset threshold level from the first color value. Thus, apparatuses 10, 20, 30, and/or 40 may change the colors of the icons along with a change of the background color of the navigation page to improve the visibility, aesthetic appearance, and/or usage of the displayed icons.

Based on the description above, apparatuses 10, 20, 30, and/or 40 may display the icons with different areas at irregular positions in the browser navigation page. This is different from the conventional displaying manners of the icons in the navigation page, by displaying the icons with different areas, at different positions, and/or in different layouts. Moreover, apparatuses 10, 20, 30, and/or 40 may adjust the areas of the icons according to the click counts of the icons. For example, a greater click count may correspond to a larger area, and a smaller click count may correspond to a smaller area. When the click count of a certain icon is relatively increased compared to the click count of another icon, apparatuses 10, 20, 30, and/or 40 may automatically adjust the areas of the icons in the navigation page according to the statistics, e.g., values, of the click counts, to make the icons having relatively greater click counts more prominent, leading to a variety of displaying forms, as well as an improvement to the user experience.

Figure 10:
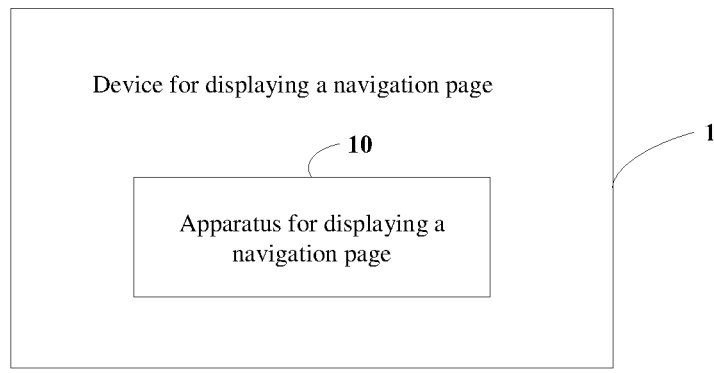
FIG. 10 depicts a block diagram illustrating an exemplary device for displaying a browser navigation page, according to embodiments of the present disclosure.

FIG. 10 depicts a block diagram illustrating an exemplary device 1 for displaying a browser navigation page. Device 1 may include at least one of apparatus 10, 20, 30, and 40. Device 1 may include a non-transitory memory that stores instructions in accordance with the steps of method 100, 200, 300, and/or 400. Device 1 may include one or more processors that execute the stored instructions to cause device 1 to perform operations including a selection of the steps of method 100, 200, 300, and/or 400.

Embodiments of the present disclosure may be used in various universal or dedicated computing systems or configurations, for example, personal computers, server computers, handheld devices or portable devices, tablet devices, multi-processor systems, microprocessor-based systems, smart TV boxes, programmable consumer electronic devices, network PCs, video game consoles, computer entertainment devices, mini-computers, mainframe computers, distributed computing environments, including any one of the above systems or devices, and so on.

The present disclosure may be described in a general context of computer executable commands or operations executed by a computing device, such as a program module, including at least one of a microprocessor, a processor, a central processing unit (CPU), a graphical processing unit (GPU), an application specific integrated circuits (ASIC), or a Field Programmable Gate Array (FPGA). In general, the program module may include routines, procedures, objects, components, data structures, processors, memories, and the like for performing specific tasks or implementing a sequence of steps or operations. The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote computer readable storage medium, including a storage device, such as hard disks, floppy disks, or CD-ROM, or other forms of RAM or ROM. Furthermore, although aspects of the disclosed embodiments are described as being associated with data and/or information stored in a memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

As will be understood by those skilled in the art, embodiments of the present disclosure may be embodied as a method, a system or a computer program product. Accordingly, embodiments of the present disclosure may take the form of an entirely hardware embodiment, an entirely software embodiment, or an embodiment combining software and hardware. Furthermore, embodiments of the present disclosure may take the form of a computer program product embodied in one or more computer available storage media (including but not limited to a magnetic disk memory, a CD-ROM, an optical memory, and so on) containing computer available program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory. The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media. The information storage can be implemented with any method or technology. Information may be modules of computer readable instructions, data structures, and programs, or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable medium is non-transitory, and does not include transitory media, such as modulated data signals and carrier waves.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method for displaying a browser navigation page, comprising:
    displaying one or more icons with preset areas at irregular positions in the browser navigation page;

acquiring a first icon and a second icon, whose areas have a difference of a preset pixel number, from the icons displayed in the browser navigation page, wherein a first area of the first icon is greater than a second area of the second icon;

reading a first click count of the first icon and a second click count of the second icon, wherein when the second click count is greater than the first click count, adjusting the area of the second icon to the first area, and adjusting the area of the first icon to the second area, wherein the method further comprising:

receiving an opening command for opening the browser navigation page;

displaying a preset number of icons at preset positions according to the opening command, wherein at least some of the areas of the icons follow an arithmetic sequence with a preset pixel number as a sequence difference, and the preset positions are distributed in and/or surround a central region of the navigation page;

analyzing color values of background pixels of the navigation page;

reading a first color value possessed by a largest number of the background pixels; and applying a second color value having a difference of color level equal to or larger than a preset threshold from the first color value.

2. The method of claim 1, further comprising:

periodically traversing the icons corresponding to the preset areas in accordance with a preset interval; and adjusting the area of an icon corresponding to the second area to the first area when an icon corresponding to the first area does not exist.

3. The method of claim 2, further comprising:

adjusting the area of the icon corresponding to the second area to the first area when the icon corresponding to the first area is deleted; or adjusting the area of the icon corresponding to the second area to the first area when an icon having an area larger than the first area is deleted and/or the area of the icon corresponding to the first area is adjusted.

4. The method of claim 1, further comprising:

receiving an addition command for adding a new icon to be displayed; setting a click count of the new icon; and adding the new icon with a preset minimum area to a preset position in the browser navigation page.

5. The method of claim 1, further comprising:

receiving a moving command for moving an icon corresponding to a first area among the displayed icons; and moving the icon corresponding to the first area to a target region in the navigation page according to the moving command; and if the icon moved to the target region substantially overlaps with the icons surrounding the target region, moving the icons surrounding the target region away from the icon moved to the target region.

6. An apparatus for displaying a browser navigation page, comprising:

a displaying unit that displays one or more icons with preset areas at irregular positions in the browser navigation page;

an acquiring unit that acquires a first icon and a second icon, whose areas have a difference of a preset pixel number, from the icons displayed in the browser navigation page, wherein a first area of the first icon is greater than a second area of the second icon; and a reading unit that reads a first click count of the first icon and a second click count of the second icon;

wherein when the second click count is greater than the first click count, the adjusting unit adjusts the area of the second icon to the first area, and adjusts the area of the first icon to the second area, wherein the apparatus further comprising:

a receiving unit that receives an opening command for opening the browser navigation page, wherein the displaying unit displays a preset number of icons at preset positions according to the opening command, at least some of the areas of the icons follow an arithmetic sequence having a preset pixel number as a sequence difference, and the preset positions are distributed in and/or surround a central region of the navigation page;

an analysis unit that analyzes color values of background pixels of the navigation page;

a reading unit that reads a first color value possessed by a largest number of background pixels; and an application unit that applies a second color value different from the first color value to the icons.

7. The apparatus of claim 6, further comprising:

a traversing unit that periodically traverse the icons corresponding to the preset areas in accordance with a preset interval;

wherein the adjusting unit adjusts the area of an icon corresponding to the second area to the first area when an icon corresponding to the first area does not exist.

8. The apparatus of claim 7, wherein the adjusting unit adjusts the area of the icon corresponding to the second area to the first area when the icon corresponding to the first area is deleted; or adjusts the area of the icon corresponding to the second area to the first area when the icon having an area larger than the first area is deleted and/or the area of the icon corresponding to the first area is adjusted.

9. The apparatus of claim 6, further comprising:

a receiving unit that receives an addition command for adding a new icon to be displayed;

a setting unit that sets a click count of the new icon; and an addition unit that adds the new icon with a preset minimum area to a preset position in the browser navigation page.

10. The apparatus of claim 6, further comprising:

a receiving unit that receives a moving command for moving an icon corresponding to a first area among the displayed icons; and a moving unit that moves the icon corresponding to the first area to a target region in the navigation page according to the moving command, and wherein if the icon moved to the target region substantially overlaps with the icons surrounding the target region, the moving unit moves the icons surrounding the target region away from the icon moved to the target region.

11. A device for displaying a browser navigation page, comprising:

a non-transitory memory storing instructions; and one or more processors that execute the stored instructions to cause the device to perform operations comprising:

configuring a displaying unit to display one or more icons with preset areas at irregular positions in the browser navigation page;

acquiring a first icon and a second icon, whose areas have a difference of a preset pixel number, from the icons displayed in the browser navigation page, wherein a first area of the first icon is greater than a second area of the second icon;

reading a first click count of the first icon and a second click count of the second icon; and when the second click count is greater than the first click count, adjusting the area of the second icon to the first area, and adjusting the area of the first icon to the second area, wherein the operations further comprising:

receiving an opening command for opening the browser navigation page; and displaying a preset number of icons at preset positions according to the opening command, wherein at least some of the areas of the icons follow an arithmetic sequence with a preset pixel number as a sequence difference, and the preset positions are distributed in and/or surround a central region of the navigation page;

analyzing color values of background pixels of the navigation page;

reading a first color value possessed by a largest number of background pixels; and applying a second color value different from the first color value to the icons.

12. The device of claim 11, the operations further comprising: periodically traversing the icons corresponding to the preset areas in accordance with a preset interval; and adjusting the area of an icon corresponding to the second area to the first area when an icon corresponding to the first area does not exist.

13. The device of claim 12, the operations further comprising:

adjusting the area of the icon corresponding to the second area to the first area when the icon corresponding to the first area is deleted; or adjusting the area of the icon corresponding to the second area to the first area when the icon having an area larger than the first area is deleted and/or the area of the icon corresponding to the first area is adjusted.

14. The device of claim 11, the operations further comprising:

receiving an addition command for adding a new icon to be displayed; setting a click count of the new icon; and adding the new icon with a preset minimum area to a preset position in the browser navigation page.

15. The device of claim 11, the operations further comprising:

receiving a moving command for moving an icon corresponding to a first area among the displayed icons;

moving the icon corresponding to the first area to a target region in the navigation page according to the moving command; and if the icon moved to the target region substantially overlaps with the icons surrounding the target region, moving the icons surrounding the target region away from the icon moved to the target region.

16. A non-transitory computer-readable medium storing instructions that, when executed by a computer, cause the computer to perform operations comprising: displaying one or more icons with preset areas at irregular positions in the browser navigation page;

acquiring a first icon and a second icon, whose areas have a difference of a preset pixel number, from the icons displayed in the browser navigation page, wherein a first area of the first icon is greater than a second area of the second icon;

reading a first click count of the first icon and a second click count of the second icon; and when the second click count is greater than the first click count, adjusting the area of the second icon to the first area, and adjusting the area of the first icon to the second area, wherein the operations further comprising:

receiving an opening command for opening the browser navigation page; and displaying a preset number of icons at preset positions according to the opening command, wherein at least some of the areas of the icons follow an arithmetic sequence with a preset pixel number as a sequence difference, and the preset positions are distributed in and/or surround a central region of the navigation page;

analyzing color values of background pixels of the navigation page;

reading a first color value possessed by a largest number of background pixels; and applying a second color value different from the first color value to the icons.

* * * * *